Sept. 11, 1951 B. A. KINGSBURY 2,567,380

PARALLEL T ELECTRICAL WAVE TRANSMISSION NETWORK

Filed March 31, 1949

INVENTOR
B. A. KINGSBURY
BY
Ralph T. Holcomb
ATTORNEY

Patented Sept. 11, 1951 2,567,380

UNITED STATES PATENT OFFICE 2,567,380

PARALLEL T ELECTRICAL WAVE TRANSMISSION NETWORK

Burton A. Kingsbury, Madison, N. J., assignor to Bell Telephone Laboratories, Incorporated, New York, N. Y., a corporation of New York Application March 31, 1949, Serial No. 84,691

22 Claims. (Cl. 178—44)

This invention relates to wave transmission networks and more particularly to parallel-T networks.

An object of the invention is the elimination of mutual inductance in unbalanced networks.

Other objects are to decrease the insertion loss within the transmission band and, in filters, to sharpen the cut-off and increase the discrimination.

Another object is to reduce the cost of networks of this type.

Further objects are to improve the image impedance and adjust the loss level.

As a matter of convenience, wave transmission networks are usually first designed as symmetrical lattices. When they are to be used in unbalanced circuits, however, it is necessary to transform the lattice into an equivalent unbalanced structure. Certain lattices having a favorable relationship between the component elements in the series branch and those in the diagonal branch may be transformed into bridged-T or parallel-T structures which do not require mutual inductance. But many lattices do require the use of mutual inductance in the construction of the equivalent unbalanced network. In general, networks comprising mutual inductance are more costly to build and harder to adjust and have more loss in the band, less discrimination, and less sharp cut-offs than those which do not require mutual.

Applicant has devised six equivalent parallel-T networks which considerably extend the range of transmission characteristics obtainable in unbalanced structures without resort to mutual inductance. Each of the networks comprises two or more symmetrical T's connected in parallel at both ends. One of the T's is made up of two equal series capacitances and an interposed shunt branch which includes an inductance. Another of the T's is composed of two equal series inductors and an interposed shunt branch comprising a capacitance. In one embodiment (Fig. 3) an additional capacitance is connected in series with the shunt inductance, and in another embodiment (Fig. 7) an inductance is added in series with the shunt capacitance. In two other embodiments either a capacitance (Fig. 4) or an inductance (Fig. 8) is bridged across the outer terminals of the series arms of the T's. In the remaining two embodiments either a capacitance (Fig. 5) or an inductance (Fig. 9) is connected in a shunt path common to the T's.

In order to make the image impedance more nearly a constant resistance and provide an adjustment of the insertion loss of the network, a resistor may be bridged across the outer terminals of the series arms of the T's and a second resistance connected in a shunt path common to the T's. These resistors may be made variable, either continuously or in steps, to facilitate their adjustment.

The embodiments shown are all-pass networks, or phase correctors, requiring only two parallel-T networks. It is to be understood, however, that other types of transmission characteristics may be obtained such, for example, as band-pass, low-pass, high-pass and band-elimination filters, and that more than two parallel-T's may be used in a single network.

The transformation from the prototype lattice to the parallel-T network involves the intermediate step of replacing a resonant diagonal impedance branch by two or more parallel arms each of which has the same resonant frequency as the original branch. Each of the networks of the invention is characterized by the relation that the shunt branch in series with the parallel combination of the series arms of one of the T's has the same resonant frequency as the shunt branch in series with the parallel combination of the series arms of another of the T's.

The nature of the invention will be more fully understood from the following detailed description and by reference to the accompanying drawings, in which like reference characters are used to designate similar or corresponding parts and in which.

Figures 1, 1A, 2, 3, 4, 5, 6, 7, 8, 9:
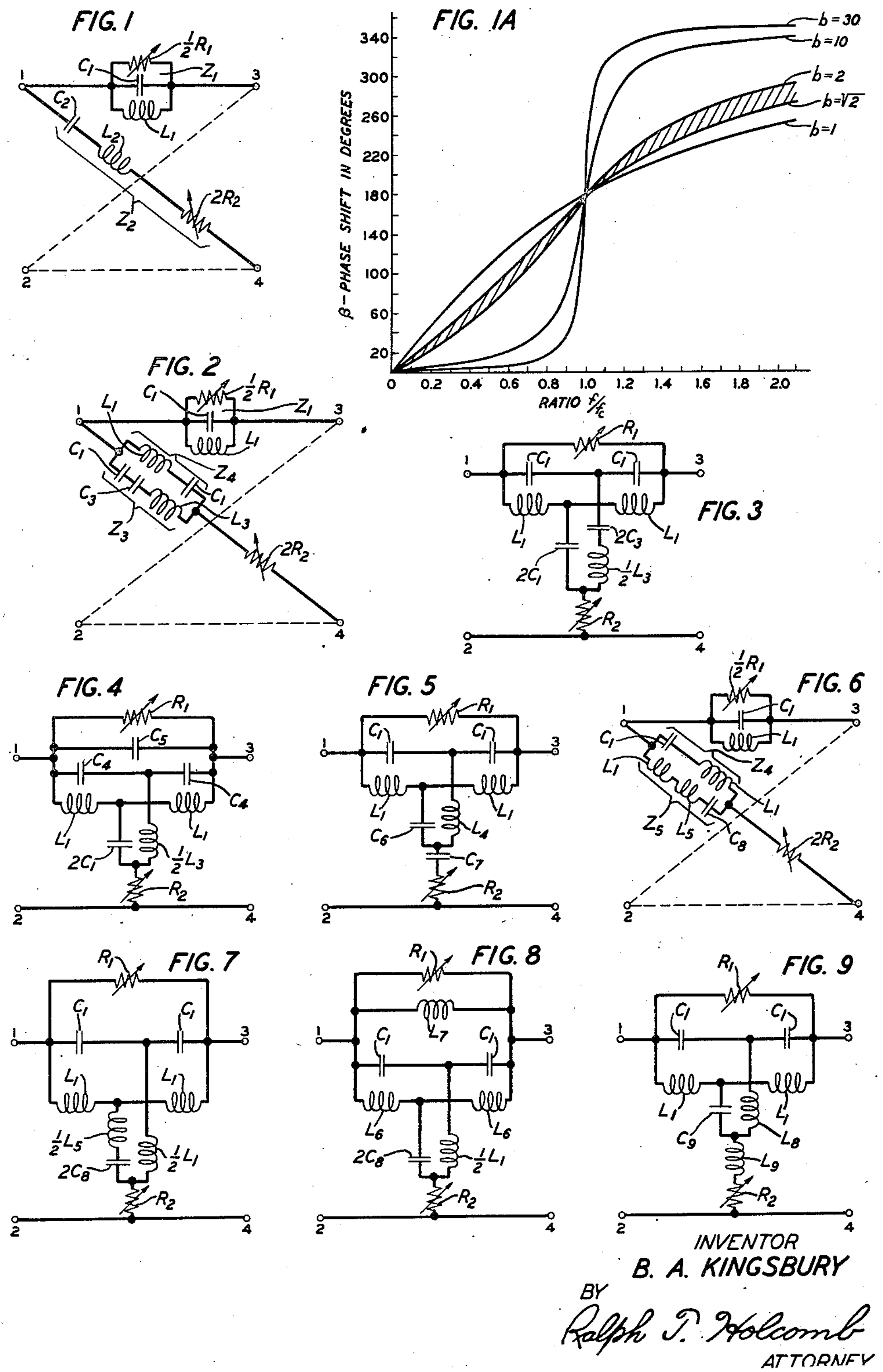
Fig. 1 is a schematic circuit of the prototype lattice network.
Fig. 1A shows a family of phase-frequency characteristics obtainable with the network of Fig. 1.
Fig. 2 shows an intermediate step in one transformation.
Figs. 3, 4 and 5 are schematic circuits of three equivalent embodiments of the parallel-T networks in accordance with the invention each employing three uncoupled inductances and four capacitances.
Fig. 6 shows an intermediate step in another transformation.
Figs. 7, 8 and 9 are schematic circuits of three other equivalent embodiments of the invention each comprising three capacitances and four uncoupled inductances.

Fig. 1 shows schematically the prototype lattice from which all of the parallel-T networks of the present invention are derived. The network comprises two equal series impedance branches $Z_1$ and two equal diagonal impedance branches $Z_2$ connected between a pair of input terminals 1, 2 and a pair of output terminals 3, 4 to form a symmetrical lattice structure. In Fig. 1, and also in the lattices of Figs. 2 and 6, only one series branch $Z_1$ and one diagonal branch $Z_2$ are shown explicitly. The other branches are represented by broken lines connecting the appropriate terminals. Each series branch $Z_1$ is made up of the parallel combination of a resistance $R_1/2$, a capacitance $C_1$ and an inductance $L_1$. Each diagonal branch $Z_2$ comprises a resistance $2R_2$, a capacitance $C_2$ and an inductance $L_2$ all connected in series. A suitable source of alternating electromotive force may be connected to the input terminals 1, 2 and a suitable load or utilization circuit may be connected to the output terminals 3, 4.

The image impedance $Z_I$ at either end of the network is $$Z_I=\sqrt{Z_1Z_2} \quad (1)$$

In equalizers and other networks of this type it is usually desirable that the image impedance $Z_I$ be a constant resistance R chosen to match the terminal impedances between which the network operates. Such a non-reactive image impedance may be provided by making the branch impedance $Z_1$ and $Z_2$ inverse with respect to $R^2$ so that they have the relationship $$Z_1Z_2=R^2 \quad (2)$$

The propagation constant $\theta$ of such a network is given by the expression $$\tanh\frac{\theta}{2}=\tanh\frac{\alpha+j\beta}{2}=\sqrt{\frac{Z_1}{Z_2}}=\frac{Z_1}{R}=\frac{R}{Z_2} \quad (3)$$

where $\alpha$ is the attenuation constant and $\beta$ is the phase constant.

The example to be presented is an all-pass network, or phase corrector, having a phase shift $\beta$ of 180 degrees at the critical frequency $f_c$ and a maximum phase shift of 360 degrees at infinite frequency. The series branch $Z_1$ will be antiresonant and the shunt branch $Z_2$ resonant at the frequency $f_c$. The values of the reactive elements may be found from the expressions $$L_1=\frac{R}{b\pi f_c}\text{ henries} \quad (4)$$

$$L_2=\frac{b^2L_1}{4}\text{ henries} \quad (5)$$

$$C_1=\frac{b}{4\pi f_cR}\text{ farads} \quad (6)$$

$$C_2=\frac{4C_1}{b^2}\text{ farads} \quad (7)$$

where $b$ is a design parameter which determines the shape of the phase characteristic and is defined as $$b=4\pi f_cRC_1=2\sqrt{\frac{C_1}{C_2}}=2\sqrt{\frac{L_2}{L_1}} \quad (8)$$

It is apparent that, when the design parameter $b$, the impedance level R and the critical frequency $f_c$ have been chosen, the values of the reactive elements may be found from Equations 4 to 7.

The resistances determine the loss $\alpha$ of the network and must satisfy the relationship $$R_1R_2=R^2 \quad (9)$$

in order to insure a non-reactive image impedance R which is constant with frequency. The values of the resistances $R_1/2$ and $2R_2$ are modified to allow for the dissipation in the reactances $L_1$, $L_2$, $C_1$ and $C_2$ at some selected frequency, such as $f_c$, and are preferably made variable, as indicated by the arrows, so that they may be readily adjusted to correct for any manufacturing variations in the elements, or to set the loss $\alpha$ at a desired level.

Fig. 1A presents a family of characteristics showing the phase shift $\beta$ in degrees plotted against the ratio of the frequency $f$ to the critical frequency $f_c$ for different values of the parameter $b$ ranging from 1 to 30. It has been assumed that the dissipation in the reactive elements $C_1$, $C_2$, $L_1$ and $L_2$ is negligible. At the frequency $f_c$ the phase shift $\beta$ is 180 degrees on each curve but the slope at this point increases as $b$ increases.

When the parameter $b$ has a value greater than 2, the lattice network shown in Fig. 1 may be transformed into an unbalanced bridged-T network which does not require the use of mutual inductance. However, when $b$ is less than 2, a negative inductance is required in the shunt branch of the T. This negative inductance may be provided by inductively coupling a pair of inductors which form the series arms of the T. It is customary to overcouple the series arm inductors and adjust the negative inductance in the shunt branch to the desired value by adding a redundant positive inductance in series therewith. This requirement of mutual inductance increases the cost of the network, makes adjustment more difficult, increases the dissipation, and introduces considerable undesired distributed capacitance associated with the tightly coupled coils. This capacitance must be evaluated and allowed for, as far as possible, in the design. The increased dissipation shows up mainly as an increase in the loss within the band and, in the case of band filters, in reduced discrimination.

The parallel-T networks in accordance with the present invention overcome these disadvantages, in networks covering the range of $b$ values between 2 and $\sqrt{2}$, the area cross-hatched in Fig. 1A for emphasis, by eliminating the mutual inductance requirement. It is assumed that the prototype lattice has the configuration shown in Fig. 1. However, since in all-pass networks the zeros and poles occur in positive and negative (conjugate complex) pairs, more elaborate all-pass networks can be broken down into a series of simple lattices of this type and, therefore, the procedures to be described below have wide application.

The symmetrical lattice of Fig. 2 shows an intermediate step in the transformation of the circuit of Fig. 1 into the two equivalent parallel-T networks in accordance with the present invention shown in Figs. 3 and 4 comprising four capacitors and three uncoupled inductors. The series branch $Z_1$ is unchanged. The reactive elements $C_2$ and $L_2$ in the diagonal branch $Z_2$ are replaced by two parallel arms $Z_3$ and $Z_4$ which together have the same inpedance at all frequencies as the reactive portion of $Z_2$. A capacitance of value $C_1$ is arbitrarily included in the arm $Z_3$ and an inductance of value $L_1$ in the arm $Z_4$. Each of the arms $Z_3$ and $Z_4$ must be resonant at the frequency $f_c$. Therefore, the capacitance in series with the inductance $L_1$ in the arm $Z_4$ must have a value $C_1$. The arm $Z_3$ is made up of a capacitance of value $C_3$ and an inductance of value $L_3$ connected in series with $C_1$. Since $L_3$ in parallel with $L_1$ must be equal to $L_2$ in the branch $Z_2$, $$\frac{L_1L_3}{L_1+L_3}=L_2 \quad (10)$$

from which $$L_3=\frac{L_1L_2}{L_1-L_2}=\frac{L_1}{4/b^2-1} \quad (11)$$

Also, since $C_1$ plus the series capacitance of $C_1$ and $C_3$ must equal $C_2$, $$C_1+\frac{C_1C_3}{C_1+C_3}=C_2 \quad (12)$$

from which $$C_3=\frac{(C_2-C_1)C_1}{2C_1-C_2}=\frac{(4/b^2-1)C_1}{2(1-2/b^2)} \qquad (13)$$

The resistances $R_1/2$ and $2R_2$ in Fig. 2 are the same as in Fig. 1. All of the elements in Fig. 2 have thus been evaluated.

The transformation to the circuit of Fig. 2 was made so that a further transformation into the parallel-T networks of the invention may be made. The reactive portion of the lattice of Fig. 2 may be considered to be made up of two lattices connected in parallel at their terminals. One of these has series branches $L_1$ and diagonal branches $Z_4$ made up of $L_1$ and $C_1$ in series. The other lattice has series branches $C_1$ and diagonal branches $Z_3$ comprising $C_1$, $C_3$ and $L_3$ in series. It is known that a lattice network having a pair of impedances A, A as the series branches and impedances B, B as the diagonal branches is the equivalent of a T-network having two series arms A, A and an interposed shunt branch equal to ½(B—A). Therefore, as shown in Fig. 3, the first partial lattice may be replaced by the T-network having the series arms $L_1$ and a shunt branch $2C_1$. In like manner the second partial lattice is represented in Fig. 3 by the T-network with series arms $C_1$ and a shunt branch made up of a capacitance $2C_3$ in series with an inductance $L_3/2$. The network is completed by the bridging resistance $R_1$ and the resistance $R_2$ in a shunt path common to the T's. All of the element values in Fig. 3 are thus obtained from Fig. 2 either directly or by the application of numerical multipliers. The network of Fig. 3 is equivalent to the network of Fig. 2 and, therefore, also to the network of Fig. 1. It is one embodiment of the parallel-T networks of the present invention and requires no mutual inductance for values of $b$ falling between 2 and $\sqrt{2}$.

The circuit shown in Fig. 4 is derived from the one shown in Fig. 3 by replacing the T of capacitances $C_1$, $C_1$ and $2C_3$ by the equivalent $\pi$ of capacitances $C_4$, and $C_4$ and $C_5$ which have the values $$C_4=(4/b^2-1)C_1 \qquad (14)$$

$$C_5=(1-2/b^2)C_1 \qquad (15)$$

The other elements in Fig. 4 are the same as those appearing in Fig. 3.

Another embodiment of the invention, also equivalent to the lattice of Fig. 1, is shown in Fig. 5. The circuit is the same as the one in Fig. 3 except that the shunt branches of the T-networks are rearranged so that they comprise, respectively a capacitance $C_6$ and an inductance $L_4$, with a capacitance $C_7$ in the shunt path common to the T's. These new elements may be evaluated by applying to the reactive portion of the network of Fig. 5 the bisection theorem given by Bartlett in "The Theory of Electrical Artificial Lines and Filters," pages 28 to 31. The bisected impedance when shorted yields a capacitance $C_1$ in parallel with an inductance $L_1$, which is the same as the reactive portion of the series impedance $Z_1$ in Fig. 1, in accordance with the theorem. The open bisected impedance comprises a capacitance $C_7/2$ in series with two parallel arms, one consisting of $C_1$ and $2L_4$ in series and the other of $L_1$ and $C_6/2$ in series. In accordance with the theorem this impedance must be the same as the reactive portion of the diagonal branch $Z_2$ in Fig. 1. Therefore, the inductance of $L_1$ in parallel with $2L_4$ must be equal to $L_2$, giving $$\frac{1}{L_1}+\frac{1}{2L_4}=\frac{1}{L_2} \qquad (16)$$

from which $$L_4=\frac{L_1L_2}{2(L_1-L_2)}=\frac{L_1}{2(4/b^2-1)} \qquad (17)$$

Since the branch $Z_2$ has only a single resonance, $C_1$ and $2L_4$ must resonate at the same frequency as $L_1$ and $C_6/2$, so that $$2L_4C_1=L_1C_6/2 \qquad (18)$$

from which $$C_6=\frac{4L_4C_1}{L_1}=\frac{2C_1}{L/b^2-1} \qquad (19)$$

Furthermore, the capacitance of $C_7/2$ in series with the parallel combination of $C_1$ and $C_6/2$ is equal to $C_2$, that is $$\frac{1}{C_7/2}+\frac{1}{C_1+C_6/2}=\frac{1}{C_2} \qquad (20)$$

and therefore $$C_7=\frac{2C_2(C_1+C_6/2}{C_1-C_2+C_6/2}=\frac{2C_1}{b^2/2-1} \qquad (21)$$

The lattice network of Fig. 6 shows a second intermediate transformation used in deriving the equivalent parallel-T networks in accordance with the present invention shown in Figs. 7 and 8, comprising three capacitors and four uncoupled inductors. The circuit of Fig. 6 is the same as the one shown in Fig. 2 except that the arm $Z_3$ of the diagonal branch is replaced by the arm $Z_5$. The arm $Z_5$ is derived from the arm $Z_3$ by replacing the two series capacitances $C_1$ and $C_3$ by an equivalent single capacitance $C_8$ and by dividing the inductance $L_3$ into the two inductances $L_1$ and $L_5$. Therefore, each of the arms $Z_4$ and $Z_5$ is resonant at the frequency $f_c$ and their impedance in parallel is the same at all frequencies as the impedance of the reactive portion of the branch $Z_2$ in Fig. 1. The values of the new elements are $$L_5=L_3-L_1=\frac{2-4/b^2}{4/b^2-1}L_1 \qquad (22)$$

$$C_8=\frac{C_1C_3}{C_1+C_3}=(4/b^2-1)C_1 \qquad (23)$$

The parallel-T network shown in Fig. 7 is derived from the lattice of Fig. 6 by transforming the partial lattice with series branches $C_1$ and diagonal branches $Z_4$ into the equivalent T with series arms $C_1$ and shunt branch $L_1/2$ and transforming the partial lattice with series branches $L_1$ and diagonal branches $Z_5$ into the T having series arms $L_1$ and a shunt branch comprising an inductance $L_5/2$ in series with a capacitance $2C_8$. The bridging resistance $R_1$ and the resistance $R_2$ in a shunt path common to the T's complete the network.

The circuit shown in Fig. 8 is derived from the one shown in Fig. 7 by transforming the T of inductances $L_1$, $L_1$ and $L_5/2$ into the equivalent $\pi$ of inductances $L_6$, $L_6$ and $L_7$ which have the values $$L_6=\frac{L_1}{4/b^2-1} \qquad (24)$$

$$L_7=\frac{L_1}{1-2/b^2} \qquad (25)$$

Fig. 9 shows another embodiment of the invention which is equivalent to the lattice of Fig. 1.

The circuit is the same as Fig. 8 except that the shunt branches of the T-networks are rearranged to comprise, respectively, a capacitance $C_9$ and an inductance $L_8$, with an inductance $L_9$ in the shunt path common to the T's. By an application of Bartlett's bisection theorem in the same manner as explained above in connection with Fig. 5 the open bisected impedance comprises an inductance $2L_9$ in series with two parallel arms, one consisting of $C_1$ and $2L_8$ in series and the other of $L_1$ and $C_9/2$ in series. Since this impedance must be the same as the reactive portion of the diagonal branch $Z_2$ in Fig. 1 the new elements will have the following values:

$$C_9=2(C_2-C_1)=2(4/b^2-1)C_1 \qquad (26)$$

$$L_8=\frac{L_1C_9}{4C_1}=\frac{(4/b^2-1)L_1}{2} \qquad (27)$$

$$L_9=\frac{L_2}{2}-\frac{1}{2/L_1+1/L_8}=\frac{(b^2/2-1)L_1}{2} \qquad (28)$$

In Figs. 3, 4 and 5 it will be noted that the ratio of the series inductance $L_1$ to the inductance in the shunt branch, $L_3/2$ or $L_4$, is equal to $2(4/b^2-1)$. Also in Figs. 7, 8 and 9 the ratio of the capacitance in the shunt branch, $2C_8$ or $C_9$, to the series capacitance $C_1$ is equal to $2(4b^2-1)$.

The embodiments of the parallel-T networks in accordance with the present invention shown in Figs. 3, 4, 5, 7, 8 and 9 are all equivalent to the prototype lattice of Fig. 1 and may be constructed for values of the parameter $b$ falling between 2 and $\sqrt{2}$ but require no mutual inductance. The equivalence of the parallel-T networks to the prototype lattice may be checked by the application of the bisection theorem.

As already pointed out, in each of the networks the shunt branch in series with the parallel combination of the series arms of one of the T's has the same resonant frequency as the shunt branch in series with the parallel combination of the series arms of the other T. For example, in Fig. 3 the series arms $C_1$, $C_1$ in parallel will have a capacitance of $2C_1$, which in series with the shunt arm made up of $2C_3$ and $L_3/2$ will have half the impedance of the arm $Z_3$ in Fig. 2 but the same resonant frequency $f_c$. Likewise, the series arms $L_1$, $L_1$ in parallel will have an inductance of $L_1/2$ which in series with the shunt arm $2C_1$ will have half the impedance of the arm $Z_4$ in Fig. 2 but will also resonate at the frequency $f_c$.

In each of the networks shown in Figs. 3, 5, 7 and 9 one of the T's comprises two series capacitances $C_1$ and an interposed shunt branch including an inductance, and the other T comprises two series inductances $L_1$ and an interposed shunt branch including a capacitance. From Equations 4 and 6 it is found that $C_1$ and $L_1$ are related to the frequency $f_c$, at which the network has a phase shift of 180 degrees, in the following simple manner:

$$f_c=\frac{1}{2\pi\sqrt{L_1C_1}} \qquad (29)$$

As already mentioned, the resistances $R_1$ and $R_2$ in the parallel-T networks are adjusted to compensate, preferably at the frequency $f_c$, for manufacturing variations in the resistances associated with the component reactors, and also to set the loss $\alpha$ at the desired level. After their proper values have been determined these resistances may, of course be replaced by fixed ones if desired.

What is claimed is:

1. A wave transmission network comprising two T's connected in parallel, one of said T's comprising two equal series capacitances and an interposed shunt branch including an inductance, the other of said T's comprising two equal series inductances and an interposed shunt branch including a capacitance, and the shunt branch of said one T in series with the parallel combination of the series arms of said one T having the same series-resonant frequency as the shunt branch of said other T in series with the parallel combination of the series arms of said other T.

2. A network in accordance with claim 1 which includes a resistance bridging the outer terminals of the series arms of said T's and a second resistance in a shunt path common to said T's.

3. A network in accordance with claim 2 in which said resistances are variable.

4. A network in accordance with claim 2 which has a non-reactive image impedance, the product of said resistances being approximately equal to the square of said impedance.

5. A network in accordance with claim 1 in which the shunt branch of one of said T's is resonant.

6. A network in accordance with claim 1 which includes a series capacitance in the shunt branch of said one T.

7. A network in accordance with claim 1 in which each of said series capacitances in said one T has half the value of said capacitance in the other of said T's.

8. A network in accordance with claim 1 which includes a reactance bridging the outer terminals of the series arms of said T's.

9. A network in accordance with claim 8 in which said reactance is a capacitance.

10. A network in accordance with claim 1 which includes a reactance in a shunt path common to said T's.

11. A network in accordance with claim 10 in which said reactance is an inductance.

12. A network in accordance with claim 1 which has an all-pass transmission characteristic.

13. A network in accordance with claim 12 which has a non-reactive image impedance R, a phase shift of 180 degrees at the frequency $f_c$, and a parameter $b$ falling between 2 and $\sqrt{2}$, where $b$ is defined as $$b=4\pi f_cRC_1$$

and $C_1$ is the value of each of said series capacitances.

14. A network in accordance with claim 13 in which the ratio of one of said series inductances to the inductance in said shunt branch is approximately equal to $2(4/b^2-1)$.

15. A network in accordance with claim 13 in which the ratio of the capacitance in said shunt branch to one of said series capacitances is approximately equal to $2(4/b^2-1)$.

16. An all-pass wave transmission network comprising two T's connected in parallel, one of said T's comprising two series capacitances each of value $C_1$ and an interposed shunt branch including an inductance, the other of said T's comprising two equal series inductances each of value $L_1$ and an interposed shunt branch including a capacitance, in which $$f_c=\frac{1}{2\pi\sqrt{L_1C_1}}$$

where $f_c$ is the frequency at which the network has a phase shift of 180 degrees.

17. A network in accordance with claim 16 which has a non-reactive image impedance R and a parameter $b$ falling between 2 and $\sqrt{2}$, where $b$ is defined as $$b=4\pi f_c RC_1$$

18. An all-pass wave transmission network comprising two T's connected in parallel, one of said T's comprising two series capacitances each of value $C_1$ and an interposed shunt branch including the series combination of a capacitance $2C_3$ and an inductance $L_3/2$, the other of said T's comprising two equal series inductances each of value $L_1$ and an interposed shunt branch including a capacitance $2C_1$, said network having a phase shift of 180 degrees at the frequency $f_c$, a non-reactive image impedance R, and a parameter $b$ falling between 2 and $\sqrt{2}$, in which $$b=4\pi f_c RC_1$$

$$L_1=R/b\pi f_c$$

$$L_3=\frac{L_1}{4/b^2-1}$$

and $$C_3=\frac{(4/b^2-1)C_1}{2(1-2/b^2)}$$

19. An all-pass wave transmission network comprising two T's connected in parallel and a bridging branch, one of said T's comprising two series capacitances each of value $C_4$ and an interposed shunt branch including an inductance $L_3/2$, the other of said T's comprising two series inductances each of value $L_1$ and an interposed shunt branch including a capacitance $2C_1$, said bridging branch including a capacitance $C_5$, and said network having a phase shift of 180 degrees at the frequency $f_c$, a non-reactive image impedance R, and a parameter $b$ falling between 2 and $\sqrt{2}$, in which $$b=4\pi f_c RC_1$$

$$L_1=R/b\pi f_c$$

$$L_3=\frac{L_1}{4/b^2-1}$$

$$C_4=(4/b^2-1)C_1$$

and $$C_5=(1-2/b^2)C_1$$

the shunt branch of said one T in series with the parallel combination of the series arms of said one T having the same series-resonant frequency as the shunt branch of said other T in series with the parallel combination of the series arms of said other T.

20. An all-pass wave transmission network comprising two T's connected in parallel and a shunt path common to said T's, one of said T's comprising two series capacitors each of value $C_1$ and an interposed shunt branch including an inductance $L_8$, the other of said T's comprising two series inductances each of value $L_1$ and an interposed shunt branch including a capacitance $C_9$, said common shunt path including an inductance $L_9$, and said network having a phase shift of 180 degrees at the frequency $f_c$, a non-reactive image impedance R, and a parameter $b$ falling between 2 and $\sqrt{2}$, in which $$b=4\pi f_c RC_1$$

$$L_1=R/b\pi f_c$$

$$L_8=\frac{(4/b^2-1)L_1}{2}$$

$$L_9=\frac{(b^2/2-1)L_1}{2}$$

and $$C_9=2(4/b^2-1)C_1$$

the shunt branch of said one T in series with the parallel combination of the series arms of said one T having the same series-resonant frequency as the shunt branch of said other T in series with the parallel combination of the series arms of said other T.

21. A network in accordance with claim 1 which includes a capacitance of value $C_7$ in a shunt path common to said T's, each of said equal series capacitances having a value $C_1$, each of said equal series inductances having a value $L_1$, said inductance in the shunt branch of said one T having a value $L_4$, said capacitance in the shunt branch of said other T having a value $C_6$, and said network having a phase shift of 180 degrees at the frequency $f_c$, a non-reactive image impedance R, and a parameter $b$ falling between 2 and $\sqrt{2}$, where $$C_1=b/4\pi f_c R$$

$$C_6=\frac{2C_1}{4/b^2-1}$$

$$C_7=\frac{2C_1}{b^2/2-1}$$

$$L_1=R/b\pi f_c$$

and $$L_4=\frac{L_1}{2(4/b^2-1)}$$

22. A network in accordance with claim 1 which includes an inductance of value $L_5/2$ connected in series with said capacitance in the shunt branch of said other T, each of said equal series capacitances having a value $C_1$, each of said equal series inductances having a value $L_1$, said inductance in the shunt branch of said one T having a value $L_1/2$, said capacitance in the shunt branch of said other T having a value $2C_8$, and said network having a phase shift of 180 degrees at the frequency $f_c$, a non-reactive image impedance R, and a parameter $b$ falling between 2 and $\sqrt{2}$, where $$C_1=b/4\pi f_c R$$

$$C_8=(4/b^2-1)C_1$$

$$L_1=R/b\pi f_c$$

and $$L_5=\frac{2-4/b^2}{4/b^2-1}L_1$$

BURTON A. KINGSBURY.

REFERENCES CITED

The following references are of record in the file of this patent:

UNITED STATES PATENTS

| Number | Name | Date |
|---|---|---|
| 2,029,698 | Bode | Feb. 4, 1936 |
| 2,058,210 | Bode | Oct. 20, 1936 |